Aug. 12, 1930. C. BIRDSEYE 1,773,080
ANIMAL FOOD PRODUCT
Filed June 20, 1927

INVENTOR:
Clarence Birdseye
BY
ATTORNEY

Patented Aug. 12, 1930

1,773,080

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

ANIMAL FOOD PRODUCT

Application filed June 20, 1927. Serial No. 200,047.

My invention relates to a food product consisting of animal tissue, raw or cooked, which is compacted by pressure into a block or slab having comparatively few air spaces and of such size or thickness that by quick freezing the same at very low temperature the cells of the tissue are preserved intact and the pristine qualities and flavors of the food are retained and remain unimpaired for a substantial period of time after the block has been thawed. A method and apparatus for preparing my improved product are described in application Serial No. 199,693, filed June 18, 1927, and application Serial No. 290,976, filed July 6, 1928.

My invention has especial value when embodied in frozen blocks of fish or meat, preferably raw.

In preparing a block of frozen animal food embodying my invention, I first compress the food into a compact block or slab, thereby consolidating it and freeing the mass of air as much as possible. The less the air, the less the bacteria held in the frozen block and the more rapidly, uniformly and efficaciously the block may be frozen. Preferably the block to be frozen is encased in the wrapper or carton in which it is later marketed. It is an advantage to make the block thin because it is more readily frozen throughout its mass.

I next freeze the block so rapidly and at such low temperature that the cells of the animal tissue are substantially unbroken, whereby the pristine qualities and flavors are retained and persist for a substantial time after thawing. Indeed, on thawing, my food product returns substantially to its original condition as if it had never been frozen.

I have obtained excellent results by packing and compressing the food in a carton, the mass being about two inches thick, thus producing a consolidated block comparatively free of air, and squeezing the block between metal plates which are maintained at a temperature of 20° to 40° below 0° F. A block of this thickness subjected to this temperature will be completely frozen in about one and a quarter hours. By squeezing the block between these metal plates the block is further compacted and is simultaneously frozen so quickly that the cells of the animal tissue are substantially unbroken. The thinner the block, the more rapid the freezing, and the temperature may be adjusted in accordance with the thickness of the block. When the food is frozen in the original package, it is ready for marketing as soon as it is frozen.

My invention constitutes a novel departure in animal food products, and, so far as I am aware, has resulted in the marketing for the first time of frozen blocks of fish and meat, preferably in the package in which they are frozen, which, while frozen, can be stored for a long period of time, and transported and marketed at a distance, and then, after being thawed, reassume their original condition as before freezing, in that the natural qualities, moisture or flavors of the original food are retained, and desiccation and decay will not proceed substantially any more rapidly than in the original food.

In the drawings, I show a preferred embodiment of my invention, in which

Figure 1:
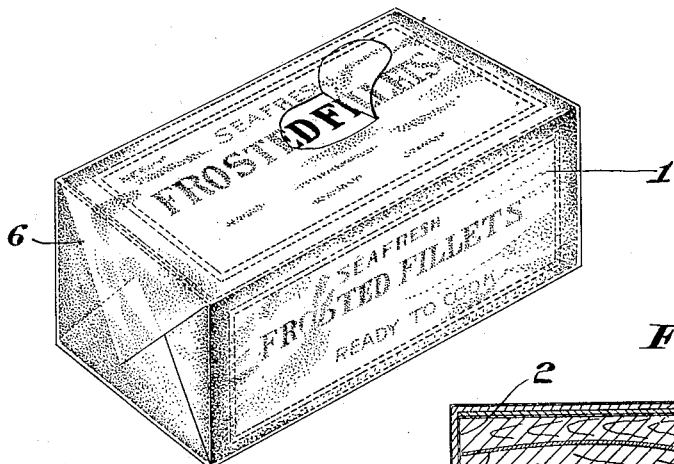
Figure 1 is a perspective view of a package in which my food product has been frozen.
Figure 2:
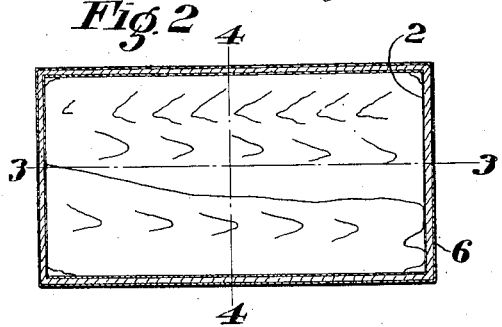
Figure 2 is a horizontal, cross-sectional view of said package, immediately beneath the cover.
Figure 3:
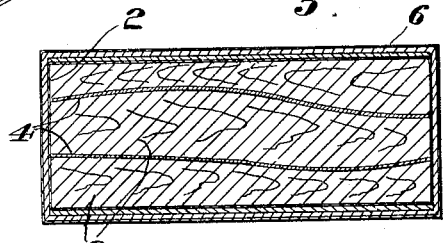
Figure 4:
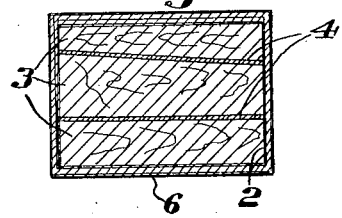
Figure 5:
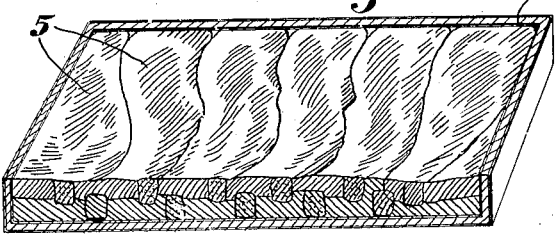

Figures 3 and 4 are sectional views on lines 3—3 and 4—4 respectively, of Figure 2; and Figure 5 is a perspective view of an open and sectional portion of another package, containing meat ready for freezing.

As a preferred method of preparing my new product, I preferably pack the food in a suitable container, such as the cardboard carton 1, which may be and is preferably waxed or otherwise rendered resistive to the passage or absorption of moisture. For further protection, the said container should preferably be lined with, or the contents wrapped in an appropriate waxed paper or other moisture proof material 2. I have attained satisfactory results by the use of a paraffined vegetable parchment paper, which does not disintegrate with exposure to moisture. The paraffin coating resists the passage of moisture and keeps the paper from sticking to the contents.

With the container standing open, a layer of the food product is placed in the bottom thereof. If the food product, for instance, is fish fillets, as indicated in Figures 2 to 4, the fish, either as a single fillet, if of suitable size, or a plurality of fillets if required, is laid into said container. I have endeavored to illustrate in Figures 2 to 4 of the drawings, fish fillets 3 in said container, in which the first layer may be separated from the next layer by a moisture absorbent separator or filler 4, and so on for the several layers which the container will accommodate.

The fillets 3 are of the usual irregular shapes when inserted in the container, and the parts which are too wide to go into the container flat may be crumpled, folded or squeezed to get them in, endeavoring so far as practicable to press the extra width of the fish toward the part of the container where the fish is not so wide. After the several layers and separators are inserted, the moisture proof lining or protective material 2 is laid over the top and the cover closed. Sufficient pressure is applied to properly close the container and at the same time consolidate the contents and tend to spread the thicker parts of the food product into the areas not so well filled. As a result of this pressure, the separators may be more or less distorted, as indicated in Figures 3 and 4, but still define the layers, keeping them distinct, separable units.

Referring to Figure 5, there are shown layers of meat chops 5, packed close together to avoid air spaces. The arrangement is furthermore such, that the bones of the chops in the lower row will preferably underlie the meat portions of the row above, and so on, so that when pressure is applied to the package, the contents can give, thereby enabling the contents to be substantially flat against the top and the bottom of the container. In this instance, also, the container is provided with the protective lining 2, which is closed over the top of the product when the container is filled, after which the cover of the container is closed. If desired, each chop can be wrapped in such a protective wrapping. In the same manner, such products as steaks, chickens, and Hamburger steak can be similarly packed. Of course, if the product is one such as Hamburger steak, packing in layers may be disregarded, although fillers may, if desired, be used to form separable units. By filling the carton as completely as possible with the food product, I insure intimacy of contact between the various layers or pieces of food, and between the container and the food, and a minimum of air pockets, so that there may be uniform and rapid heat transference throughout the mass and outward through the container itself.

After performing the steps as above outlined, unless the product is to be marketed very soon after freezing, the container is wrapped, as in a waxed or paraffined paper 6, and this wrapping is substantially hermetically sealed by use of hot plates or otherwise.

The desired product may then be obtained by introducing the package into such a refrigerating apparatus as the one shown and described in my co-pending application, above identified, by which the filled package is squeezed between metal surfaces, which are maintained at a sufficiently low temperature to rapidly freeze the food into the frozen block or slab heretofore described. By thus squeezing the packed carton between the metal surfaces, the food, which is comparatively yielding, will tend to fill any voids in the carton, and any unevenness in the contents of the carton is flattened out so that the product presents a substantially even flat surface immediately juxtaposed against the sides of the carton. This insures a minimum of insulating air layers, and the package and the juxtaposed flattened surface area of the food product will be directly and uniformly subject to heat transference from the metal surfaces, which results in effective heat transference throughout the mass of the product. There will therefore be uniform and complete freezing in the minimum length of time. The character of the package as above described retards any evaporation of the natural moisture of the food product and protects it against desiccation.

Also, in the course of freezing, the food product will expand, and it is desirable that this natural expansion should, so far as possible, take place within the package itself, in order to further consolidate the block by increasing the intimacy of contact of the contents of the package, with resulting uniformity and rapidity of freezing, and to insure that the completely frozen package shall not be bulged or distorted, but shall be slightly and regular in shape. This desirable result is insured by holding the package during the freezing period between the metal surfaces which press on the package at top and bottom.

While I have illustrated and described a preferred method, by which I prepare my new food product, I do not desire to be limited to a product prepared by the method herein described, but intend to cover all products, however produced, which fall within the spirit and scope of my invention, as described in the following claims.

I claim:

1. An article of manufacture, comprising a marketable package containing frozen animal tissue which has been frozen in the package and which fills said package with a minimum of air voids, said package being substantially no greater in thickness than the same package before having been frozen, the contained animal tissue having in its frozen condition substantially the same cellular structure as it had before it was frozen and retaining its pristine qualities and flavors.

2. An article of manufacture, comprising a carton packed with frozen animal tissue which has been frozen therein, said carton being substantially hermetically sealed and having throughout the same undistorted cross-sectional outline as before freezing, the contained animal tissue having in its frozen condition substantially the same cellular structure as it had before being frozen and retaining its pristine qualities and flavors.

In testimony whereof, I have signed my name to this specification.

CLARENCE BIRDSEYE.